July 24, 1923.

A. R. NYQUIST ET AL 1,462,764

SAWING MACHINERY

Filed April 8, 1920

Inventors
August R. Nyquist
and
Carl August Brandt

Witnesses

By Richard B. Owen
Attorney

July 24, 1923.	1,462,764
A. R. NYQUIST ET AL
SAWING MACHINERY
Filed April 8, 1920   3 Sheets-Sheet 2
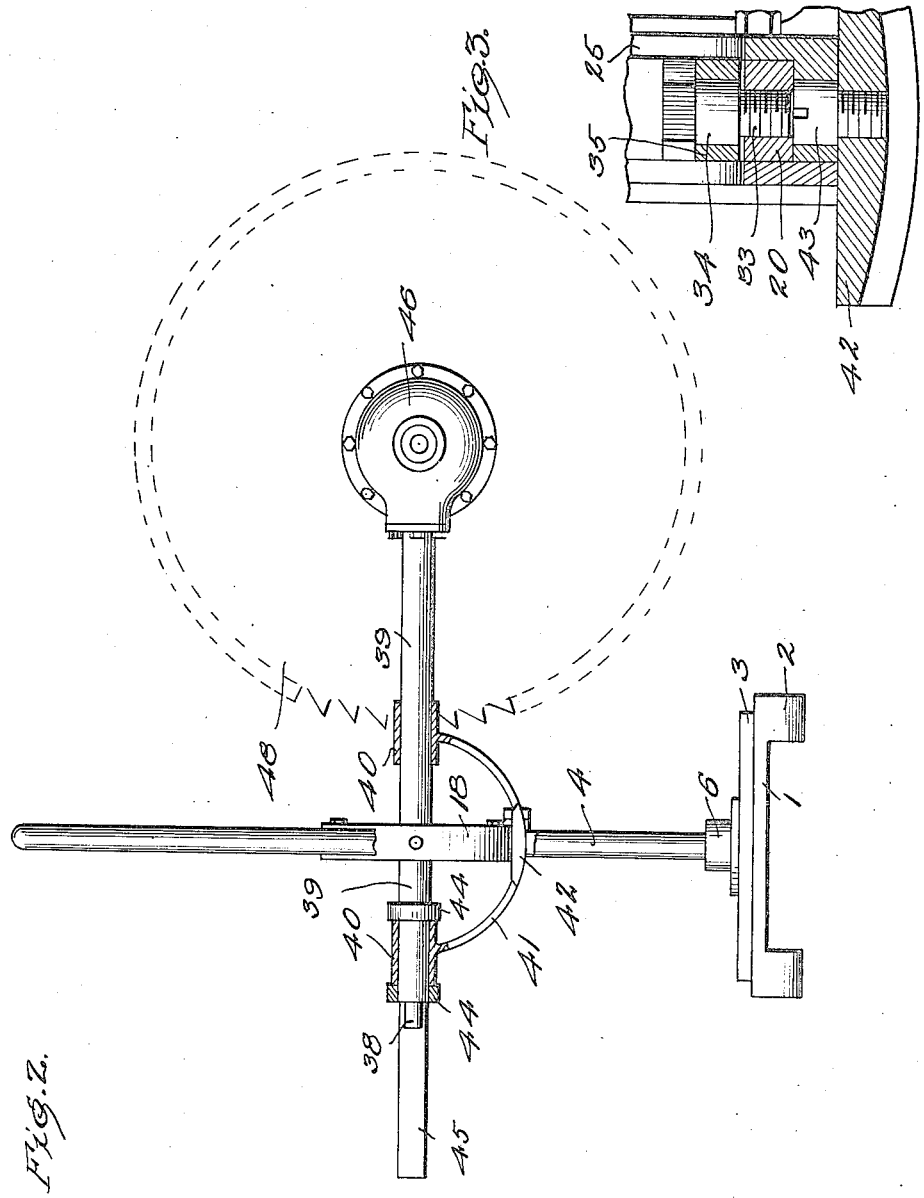

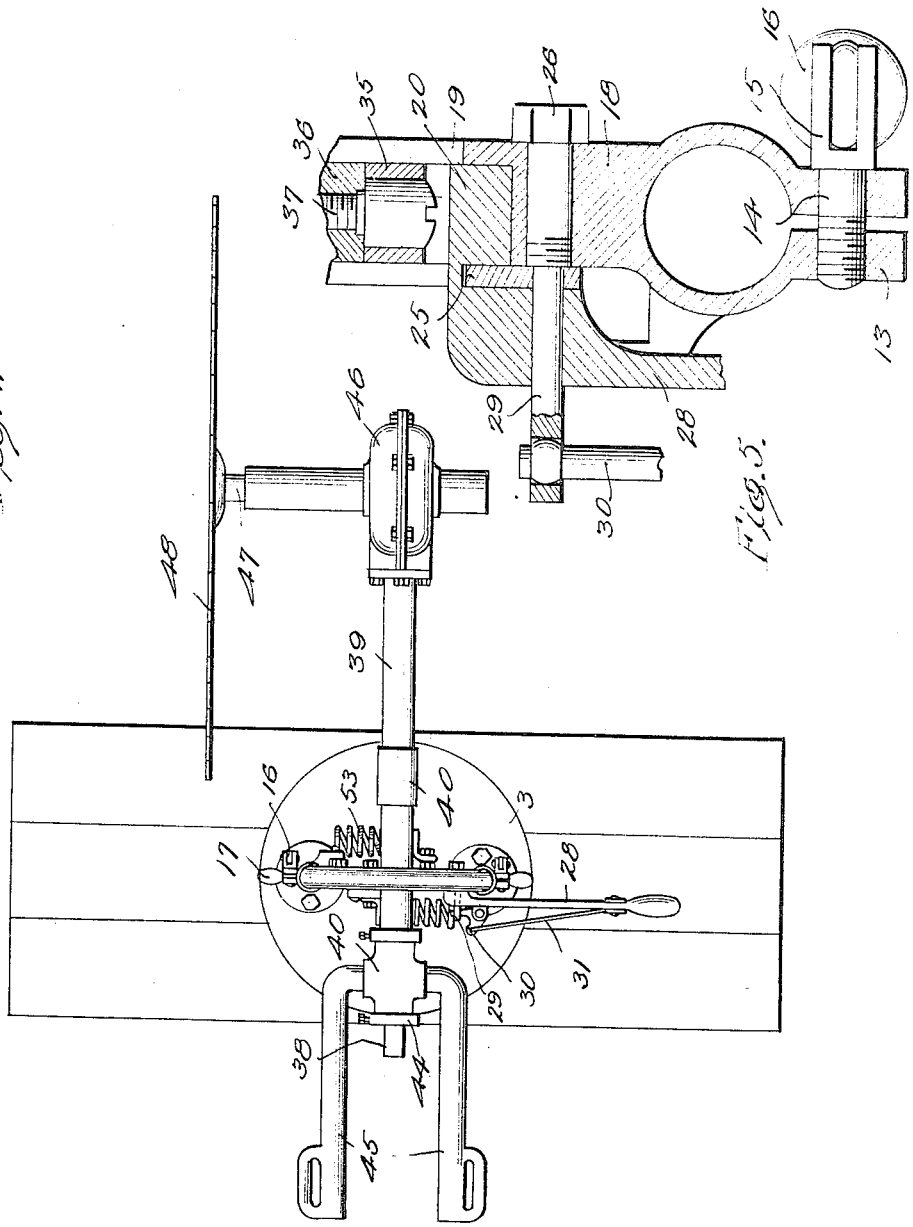

Patented July 24, 1923.

1,462,764

UNITED STATES PATENT OFFICE.

AUGUST R. NYQUIST AND CARL AUGUST BRANDT, OF ROSEAU, MINNESOTA.

SAWING MACHINERY.

Application filed April 8, 1920. Serial No. 372,203.

*To all whom it may concern:*

Be it known that we, AUGUST R. NYQUIST and CARL AUGUST BRANDT, citizens of the United States, residing at Roseau, in the county of Roseau and State of Minnesota, have invented certain new and useful Improvements in Sawing Machinery, of which the following is a specification.

This invention relates to new and useful improvements in sawing machinery, and the primary object of the device is to provide a device wherein a circular saw may be operated, vertically, horizontally, or at any desired angle for cutting down timber and sawing the same into the desired lengths and for clearing purposes, it being understood that the device may be advantageously used for sawing ice.

Another important object of the invention is to provide a device of this nature including means whereby the saw blade may be readily positioned at any desired angle and maintained in such position at the will of the operator.

Another object of the invention is to provide a device including a vertically adjustable saw frame, means for facilitating such adjustment, and means for locking the frame at any desired elevation.

A still further object of the invention is to provide a device including a base, and a saw carrying structure rotatably mounted thereon whereby the saw may be brought into operation upon any side of the device.

Still another object of the invention is to provide a main frame with which is adjustably associated a sawing mechanism frame and means for facilitating the elevation of the sawing mechanism frame and cushioning its descent.

Another object of the invention is to provide a device of the above nature which is easily operated, consists of comparatively few parts which are strong and durable and a device which is highly efficient in practice.

Other objects and advantages of the invention will become apparent during the course of the following description.

In the accompanying drawings forming a part of the application and wherein like numerals are employed to designate like parts throughout the several views Figure 1 is a front elevation of the machine, parts thereof being broken away and other parts being sectioned to more clearly show the construction.

Figure 2 is a side elevation of the device with parts thereof broken away.

Figure 3 is an enlarged fragmentary section of the sliding and oscillating bracket.

Figure 4 is a top plan of the invention, and

Figure 5 is an enlarged fragmentary horizontal section of a portion of the saw frame.

Figure 1:
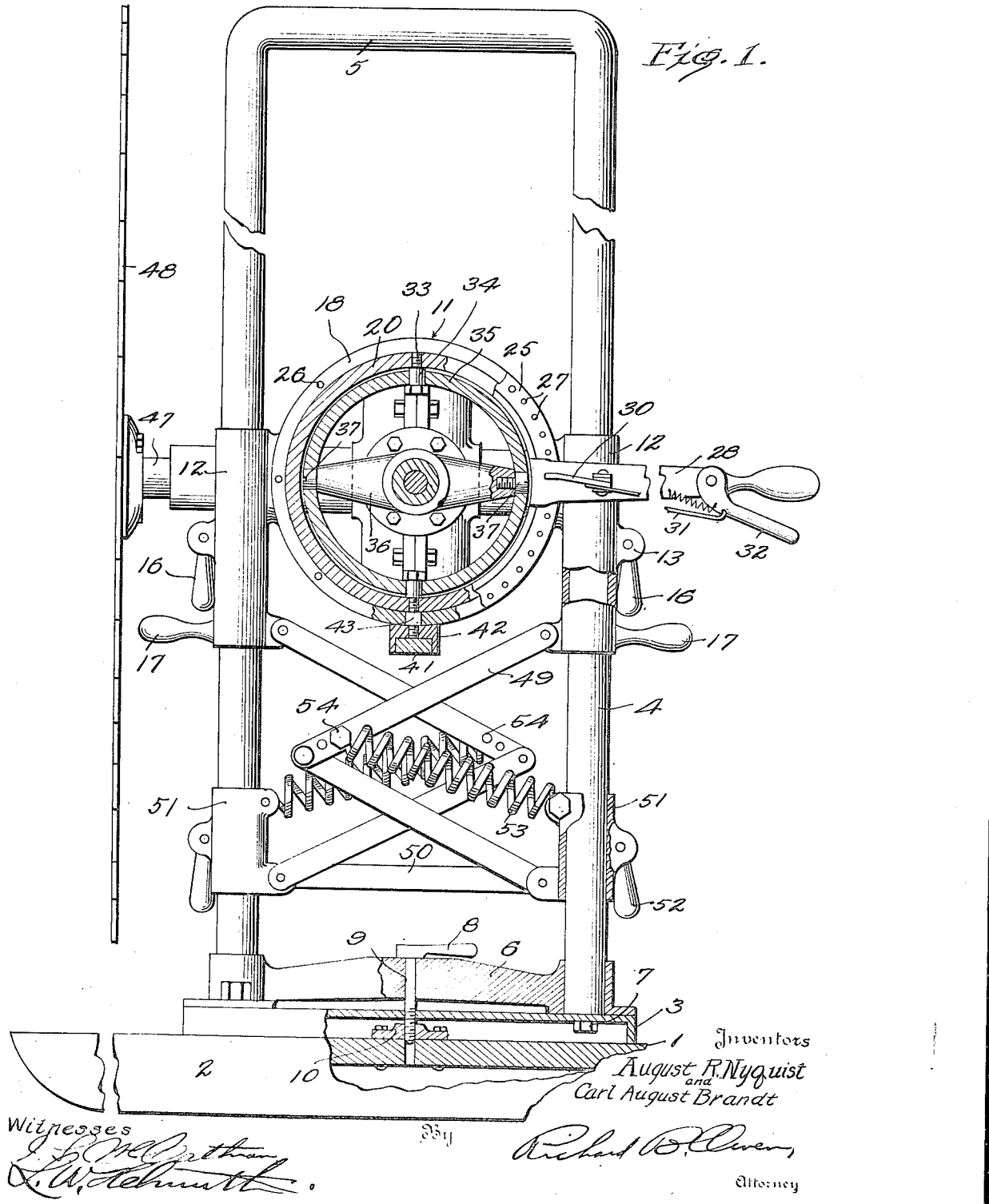

In the accompanying drawings, wherein for the purpose of illustration is shown the preferred embodiment of the invention, the numeral 1 designates the base having runners 2 thereon for transportation purposes, it of course being obvious that wheels or other conveying appliances may be applied to the base just as conditions may dictate. A revolving table 3 is mounted upon the base and rising from the same are a pair of spaced upstanding standards 4 which are joined at their upper ends by a bridging portion 5 as more clearly shown in Figure 1. The lower ends of the standards extend through a brace 6 and are secured to the revolving table by means of nuts 7 or the like. In order that the revolving table may be rigidly maintained in any desired position upon the base, means are provided to set up a binding action between the table and the base. This means consists of a lever 8 having a rod 9 extending through the brace and revolving table and having its lower end threaded into a suitable plate 10 securely fastened to the base.

What is termed as the saw carrying frame is indicated in its entirety by the numeral 11, is slidably mounted upon the standards 4 by the provision of a pair of sleeve portions 12 forming a part of the saw carrying frame. Each of these sleeves is slit longitudinally and provided with a pair of laterally extending ears 13 one of which is equipped with a threaded opening as clearly shown in Figure 5, while the coacting ear is provided with an aperture for the reception of a shank 14, the free end of which is threaded into the threaded opening of the other ear. Each shank carries a yoke head 15 between the arms of which is pivotally mounted an operating handle 16. Obviously when the shanks 14 are rotated to clamp the sleeves upon the standards, the ears 13 are brought closer together which causes the sleeves 12 to clamp around the standards and maintain the saw frame at the desired elevation. Hand grips 17 are provided upon the sleeves whereby the saw frame may be conveniently raised.

The saw frame also embodies an annulus 18, as most clearly shown in Figures 1 and 5, and which joins the two sleeves 12 as shown. A surrounding flange 19 is provided upon the annulus to assist in preventing accidental displacement of a ring 20 adapted for rotation within the annulus. As the flange 19 prevents displacement of the ring 20 from one side of the annulus a band 25 is bolted by means of bolts 26, or other suitable fastenings, to the opposite side of the annulus to prevent movement of the ring 20 in this direction. The band 25 is provided with a series of circumferentially extending apertures 27 for a purpose which will presently appear. The ring 20 is provided with a laterally extending lever 28 which operates upon the outer face of the band 25 and has a pin 29 operating transversely therethrough and into any desired opening 27. In order that the pin may be conveniently operated, a bell crank 30 is pivotally associated with one side of the lever 28 and is connected by a rod 31 to a spring controlled grip lever 32.

The ring 20 is provided with a pair of diametrically disposed bolts 33 which are threaded into the ring and extend inwardly toward the center thereof. Portions 34 of these two bolts are cylindrical and smooth and extend through diametrically disposed openings in a ring element 35 whereby the latter is mounted to swing at right angles to the axis of the ring 20. As clearly shown in Figure 1 the element 35 is surrounded by the ring 20 and it is obvious that when the latter is rotated, the element 35 is caused to move in the same direction by reason of the bolts 33 connecting these two elements.

A bearing element 36 extends diametrically across the ring like element 35 and a bolt 37 is screwed into each end of the bearing and the heads thereof operate within oppositely disposed openings in the ring like member 35. Consequently the bearing element may pivot at right angles to the axis of the ring like element 35.

A saw drive shaft is provided with a tubular casing 39 which extends through the bearing 36 and through sleeves 40 carried by the ends of a semi-circular bracket 41. This bracket is slidably mounted through an oscillatory guide 42 which is pivotally associated with the lowermost portion of the annulus 25 by a bolt 43 in the manner in which the bearing bolts 37 connect with the ring like element 35. A pair of collars are secured to the casing 39 at each end of one of the sleeves 40 to prevent the casing from sliding through these sleeves. A pair of operating handles 45 are secured to opposite sides of the innermost sleeve 40 and extend outwardly of the saw frame.

The drive shaft casing 39 extends a substantial distance outwardly of the standards 4 upon the opposite side of the machine to that side upon which the operating handles 45 are arranged and communicates with a differential housing 46 in which are mounted beveled gears whereby a saw shaft 47 may extend through the housing 46 and derive its power from the drive shaft 38. A circular saw 48 is secured in any desirable manner to the outer end of the saw shaft 47.

As most clearly shown in Figure 1 of the drawings, the upper end of a lazy-tongs structure 49 is pivotally connected to the saw frame, or in other words to the lower ends of the sleeves 12, while the lower end of the structure is pivotally connected to an auxiliary frame 50 which is slidably mounted upon the standards 4 by means of sleeves 51 similar to the sleeves 12 of the saw frame structure. This auxiliary frame is maintained at any desired position upon the standard by means of clamping the sleeves about the standard by means of the operating handles 52 and sleeve structure identical with that described for the saw frame. A pair of coiled springs 53 connect the lazy-tongs structure with the sleeves 51, the lower end of each spring being secured to its respective sleeve 51 while the upper end of each spring is secured by a bolt 54 to a portion of the uppermost link adjacent its connection with the lowermost link. Consequently when the saw frame 11 is moved downwardly of the standard, the coiled springs 53 are placed under tension, thereby making it easier to elevate the saw frame when it is again desired.

From the foregoing description it will be obvious that the saw blade may operate in horizontal and vertical planes and at any desired angle. Assuming that the saw blade is arranged in the position shown in the drawings, and it is desired to position the blade for cutting down trees and the like, the handle 28 is grasped and the pivoted lever pulled toward the handle to withdraw the pin 29 from the opening in the apertured band 25. The handle 28 is then operated to turn the ring 20, to which it is connected, and since the ring has indirect connection with the drive shaft casing 39, the saw blade may be disposed in a horizontal plane or at any angle desired. The trip 32 may then be released and the pin will automatically enter the adjacent opening 27 in the band 25. The saw blade will then be maintained in the desired position. When it is desired to rock the saw in a vertical plane, the handles 45 are grasped and the drive shaft casing 39 rocked, inasmuch as it is journaled through the bearing 36 which in turn is mounted to oscillate on a horizontal axis. The saw may be swung from one side of the frame to the other or to any point therebetween by moving the handle 45 to swing the drive shaft and casing horizontally, which will cause the ring like element 35 to pivot upon its axis or upon the bolts 33.

When it is desired to turn the rotary table 3 to change the position of the apparatus mounted thereon, the handle 8 is rotated to loosen the threaded shank 9 whereby the binding engagement between the rotary table and the base is relieved. After the table has been turned to the desired position, the handle 8 may be rotated to tighten the table's engagement with the base to maintain the table rigid in relation to the base.

The foregoing description and accompanying drawings have reference to what might be considered to be the approved or preferred form of our invention. We desire it to be understood that we may make such changes in the construction, combination and arrangement of parts, materials, dimensions, et cetera, as may prove expedient and fall within the scope of the appended claims.

Having thus fully described our invention what we claim as new and desire to secure by Letters Patent is:—

1. A sawing machine comprising a frame, a saw shaft and saw thereon, a drive shaft, a drive shaft casing, means for rotatably mounting the casing on the frame to permit movement thereof in a plane parallel with the saw shaft, means for mounting the shaft casing whereby it will pivot on an axis at right angles to the axis of the drive shaft, and means for mounting the casing for swinging movement at right angles to the last-named pivot means.

2. A sawing machine comprising a frame, a saw shaft and saw thereon, a saw drive shaft, a casing for the drive shaft, an annular casing carried by the frame, a ring mounted therein for rotation in a plane parallel to the axis of the saw shaft, a second ring like element mounted within the ring and pivoted thereto at diametrically opposite points, and a bearing for mounting the shaft casing mounted within the second ring like member and pivotally connected thereto at diametrically opposite points for pivotal movement at right angles to the axis of said second ring-like member.

3. A sawing machine comprising a frame, an annular casing connected to the frame, a ring rotatably mounted on said casing for circumferential movement therein, a member arranged within the ring and pivotally connected thereto at diametrically opposite points, a bearing member arranged within said first named member and pivotally connected thereto on an axis arranged at right angles to the pivot of said member, a shaft casing mounted in said bearing and extending at right angles to the plane of the annular casing, a drive shaft mounted in said shaft casing and a saw shaft carrying a saw blade at right angles to said drive shaft.

4. A sawing machine comprising a base, an upstanding frame carried by the base for movement about a vertical pivot, a casing slidably mounted on the frame, a bearing journalled within the casing for movement in a horizontal plane, a shaft casing extending through the bearing at right angles to the plane of the latter, a saw drive shaft in the shaft casing, a saw shaft and saw thereon at the end of the drive shaft, an arcuate bracket carried by the shaft casing, and a guide for the bracket pivotally connected to the first mentioned casing.

5. A sawing machine comprising a base, a saw frame mounted thereon for vertical adjustment, means for retaining said frame in various adjusted positions, and resilient means associated with the saw frame for retarding the descent of the saw frame.

6. A sawing machine comprising a base, standards rising therefrom, a saw frame vertically adjustable thereon, means for retaining said frame in adjusted positions, an auxiliary frame vertically adjustable on said standards, means connecting the frames whereby relative movement thereof is permitted, and resilient means associated with the last said means for retarding the descent of the saw frame.

7. A sawing machine comprising a base, standards rising therefrom, a saw frame adjustably mounted upon said standards, means for retaining the frame in various adjusted positions, an auxiliary frame adjustably mounted upon said upright, means for retaining said auxiliary frame in adjusted positions, a lazy tongs structure connecting said frame, and coiled springs connected to said auxiliary frame and to said lazy tongs structure.

In testimony whereof we affix our signatures in presence of two witnesses.

AUGUST R. NYQUIST.
CARL AUGUST BRANDT.

Witnesses:
  B. J. KUNTOM,
  AUG. RASMUSSON.